(12) United States Patent
Takita et al.

(10) Patent No.: US 7,088,491 B2
(45) Date of Patent: Aug. 8, 2006

(54) PULSE GENERATING APPARATUS AND METHOD

(75) Inventors: Yutaka Takita, Kawasaki (JP); Shigeki Watanabe, Kawasaki (JP); Fumio Futami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 39 days.

(21) Appl. No.: 10/827,328

(22) Filed: Apr. 20, 2004

(65) Prior Publication Data

US 2005/0141073 A1    Jun. 30, 2005

(30) Foreign Application Priority Data

Dec. 26, 2003   (JP)   ............... 2003-432922

(51) Int. Cl.
  *G02F 1/01*   (2006.01)
(52) U.S. Cl. .............. 359/279; 359/264; 359/326; 359/328; 250/227.18; 385/37; 372/12; 372/25; 372/26; 372/29.016; 372/29.023; 372/30; 398/44; 398/154; 398/183; 398/188; 398/201
(58) Field of Classification Search .......... 398/44, 398/154, 183, 188, 201; 250/227.18; 359/264, 359/279, 326, 328; 385/37; 372/12, 25, 372/26, 29.016, 29.023, 30
See application file for complete search history.

(56) References Cited

U.S. PATENT DOCUMENTS

| 5,381,426 A | 1/1995 | Fontana et al. |
| 5,473,458 A * | 12/1995 | Mamyshev et al. ......... 398/160 |
| 5,963,567 A * | 10/1999 | Veselka et al. ............... 372/21 |
| 6,072,615 A | 6/2000 | Mamyshev |
| 6,289,142 B1 * | 9/2001 | Yamada ......................... 385/1 |
| 6,717,708 B1 * | 4/2004 | Prosyk ........................ 359/239 |
| 6,760,142 B1 * | 7/2004 | Leuthold et al. ............. 359/279 |
| 2002/0015212 A1 | 2/2002 | Fujiwara et al. |
| 2003/0147116 A1 * | 8/2003 | Shpantzer et al. .......... 359/264 |
| 2003/0175036 A1 * | 9/2003 | Mamyshev et al. ......... 398/188 |
| 2003/0189745 A1 * | 10/2003 | Kikuchi et al. ............. 359/237 |
| 2004/0253000 A1 * | 12/2004 | Grifin .......................... 398/183 |
| 2005/0036725 A1 * | 2/2005 | Leuthold et al. ............... 385/3 |

FOREIGN PATENT DOCUMENTS

| EP | 0 676 659 A2 | 10/1995 |
| EP | 0 854 375 A2 | 7/1998 |
| EP | 1 298 819 A2 | 4/2003 |
| JP | 5-095152 | 4/1993 |

(Continued)

OTHER PUBLICATIONS

T. Kobayashi et al., "Optical Pulse Compression Using High-Frequency Electrooptic Phase Modulation", IEEE Journal of Quantum Electronics, vol. 24, No. 2, 1988, pp. 382-387.

(Continued)

*Primary Examiner*—Evelyn A. Lester
(74) *Attorney, Agent, or Firm*—Staas & Hlasey LLP

(57) ABSTRACT

An apparatus and method generating an optical pulse of picosecond class (having a high duty ratio), which accurately and stably operates at an arbitrary repetition frequency, has a high OSNR, and is not restricted by an RF modulation frequency, are provided. New modulation spectrum components are generated by performing phase modulation for light output from a single wavelength laser light source with an optical phase modulator. The phases of the modulation spectrum components are aligned by a phase adjuster, so that a pulse wave in a time domain is generated.

2 Claims, 5 Drawing Sheets

FOREIGN PATENT DOCUMENTS

| | | |
|---|---|---|
| JP | 6-302881 | 10/1994 |
| WO | 02/09325 A1 | 1/2002 |

OTHER PUBLICATIONS

E. Yoshida et al., "A 40-GHz 0.9-ps Regeneratively Mode-Locked Fiber Laser with a Tuning Range of 1530-1560 nm", IEEE Photonics Technology Letters, vol. 11, No. 12, 1999, pp. 1587-1589.

H.F. Liu et al., "Generation of Wavelength-Tunable Transform-Limited Pulses from a Monolithic Passively Mode-Locked Distributed Bragg Reflector Semiconductor Laser", IEEE Photonics Technology Letters, 1995, vol. 7, No. 10, pp. 1139-1141.

N. Froberg et al., "Multi-gigabit short pulse generation from integrated DBR laser/modulators", IEEE Lasers and Electro-optics Society 1994 Annual Meeting Conference Proceedings, vol. 2, pp. 188-189.

Volkan Kaman et al., "Integrated Tandem Traveling-Wave Electroabsorption Modulators for > 100 Gbit/s OTDM Applications", IEEE Photonics Technology Letters, vol. 12, No. 11, 2000, pp. 1471-1473.

European Search Report for European Patent Application 04 01 0084, mailed Nov. 3, 2005.

Partial European Search Report for European Patent Application 04 01 0084, mailed Aug. 3, 2005.

* cited by examiner

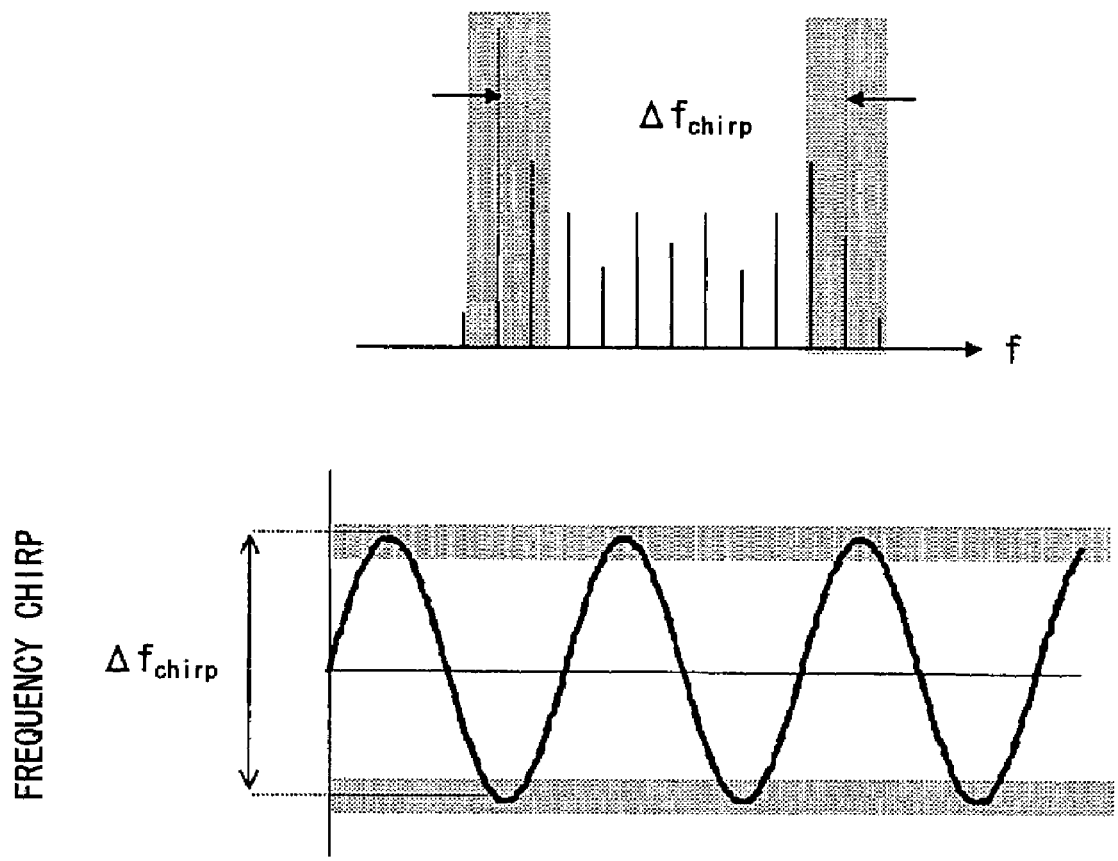
F I G. 5

PULSE GENERATING APPARATUS AND METHOD

BACKGROUND OF THE INVENTION

1. Field of the Invention

The present invention relates to an apparatus generating an optical pulse.

2. Description of the Related Art

An optical communications system currently adopts a wavelength division multiplexing (WDM) method implementing a communications bit rate of 10 giga bits/s (Gb/s, giga: $10^9$) or 40 Gb/s. With this method, however, the number of wavelengths becomes greater with an increase in a communications capacity. Therefore, it is difficult to manage signals having respective wavelengths. Additionally, a system that synchronizes signal light beams having different wavelengths, and executes signal processing in real time is required. Its configuration becomes very complex. From such viewpoints, an optical time division multiplexing (OTDM) method that enables a mass-capacity communication is considered promising. For example, a communications light source used in the OTDM must stably generate an optical pulse that is accurate to 10 Gb/s and has a pulse width of picosecond (ps, pico: $10^{-12}$) class, if a 10-Gb/s signal is multiplexed to 160 Gb/s. That is, the optical pulse having a time width, which is sufficiently shorter than the cycle time of bit rate, namely, a time width having a high duty ratio, must be stably generated at an accurate bit rate.

For this implementation, conventional techniques for generating an optical pulse are broadly classified into the following two types.

(1) a technique using a mode-locked laser pulse light source
(2) a technique using a direct modulation pulse light source FIGS. 1A and 1B show the basic configurations of the techniques using a mode-locked laser pulse light source.

Specific examples include a semiconductor mode-locked laser (FIG. 1A), and a fiber mode-locked laser (FIG. 1B). By controlling parameters such as the frequency of a driving RF (Radio Frequency) signal, a phase, the power of laser light for pumping a gain, etc., an optical pulse of subpicosecond class, which has a high optical signal-to-noise ratio, is not restricted by the frequency of the RF signal, and has a high duty ratio, can be generated. However, there is a problem that the mode-locked laser pulse light sources cannot arbitrarily and accurately implement the repetition frequency of an optical pulse due to their structures. In the mode-locked lasers, the repetition frequency $f_0$ of an optical pulse must satisfy the following equation in a relationship with the length of a resonator of the lasers if it is assumed that the velocity of light is c, the refractive index of a resonator medium is n, and N is an arbitrary integer.

$$f_0 = N \frac{c}{2nL} \quad (1)$$

Accordingly, to generate an optical pulse of a certain accurate repetition frequency $f_0$, for example, 10 giga hertz (GHz) ±100 Hz, L must be accurately manufactured.

By way of example, for the semiconductor mode-locked laser, the length of its resonator is on the order of 1 centimeter (cm), and its error margin must be suppressed to 1 nanometer (nano: $10^{-9}$) or smaller. Its implementation is difficult if its yield in commercialization is considered. In the meantime, for the fiber mode-locked laser, the length of its resonator is on the order of several tens of meters. Accordingly, only N is adjusted, and there is no need to adjust the length as strictly as in the semiconductor mode-locked laser. However, since the length of the resonator is long, it significantly varies with a small temperature change, etc. Therefore, it is difficult to stably operate the laser at an arbitrary and accurate repetition frequency.

FIG. 2 shows the basic configuration of the technique using a direct modulation pulse light source.

Its specific examples include a pulse light source using an electro-absorption modulator (EAM). This light source is configured by a single wavelength laser light source, an EAM, an RF signal source for driving the EAM, and a direct current voltage source. With this method, a stable optical pulse can be accurately generated at an arbitrary repetition frequency according to the control of the RF signal source for driving the EAM. However, since the optical transmission loss of the EAM is large, the optical signal-to-noise ratio (OSNR) of generated pulse light is significantly deteriorated when output power is amplified with an optical amplifier. For example, the optical transmission loss becomes 20 decibels (dB) or more because a reverse bias DC voltage is applied to the EAM by the direct current voltage source when an optical pulse is generated, although the optical transmission loss of the EAM itself is approximately 7 dB. This leads to the deterioration of the OSNR. Additionally, it is difficult to generate an optical pulse having a high ratio (duty ratio) of the cycle time of a modulation frequency to the time width of the optical pulse, since the waveform of the generated optical pulse depends on that of the RF signal source for driving the EAM.

As a reference document of the above described technique, Non-Patent Document 1 exists.

[Non-Patent Document 1]

IEEE Journal of Quantum Electronics, Vol. 24, No. February 1988, pp. 382–387, title "Optical Pulse Compression Using High-Frequency; Electrooptic Phase Modulation"

As described above, the mode-locked laser pulse light source can stably generate a subpicosecond class optical pulse having a high OSNR. However, it is difficult to manufacture a mode-locked laser pulse light source having an accurate length of a resonator also from a yield viewpoint, and to implement stable operations at an arbitrary and accurate repetition frequency. In the meantime, for the direct modulation pulse light source, its control is easy, and an optical pulse at an arbitrary and accurate repetition frequency can be generated. However, there are disadvantages such that: (1) an optical transmission loss in an optical intensity modulator is large, leading to the deterioration of the OSNR, and (2) it is difficult to generate an optical pulse having a high duty ratio since the width of the pulse is restricted by a modulation frequency.

SUMMARY OF THE INVENTION

An object of the present invention is to provide an apparatus and method generating an optical pulse of picosecond class (having a high duty ratio) that operates accurately and stably at an arbitrary repetition frequency, has a high OSNR, and is not restricted by an RF modulation frequency.

The optical pulse generating apparatus according to the present invention comprises: a light source outputting single wavelength light; and an optical pulse generating unit generating an optical pulse by generating modulation spectrum components by performing phase modulation for the light output from the light source, and by adjusting the phases of respective wavelengths of the modulation spectrum components included in the generated optical pulse.

The optical pulse generating method according to the present invention comprises: outputting single wavelength light; and generating an optical pulse by generating modulation spectrum components by performing phase modulation for the light output from the light source, and by adjusting the phases of respective wavelengths of the modulation spectrum components included in the generated optical pulse.

According to the present invention, an optical pulse is generated by performing phase modulation, and by adjusting the phases of respective wavelengths of modulation spectrum components obtained as a result of the phase modulation, unlike the conventional techniques.

The present invention enables the generation of an optical pulse that can be controlled with ease, accurately and stably operates at an arbitrary repetition frequency, is not restricted by the frequency of a modulation signal, and has a pulse width of picosecond class with a high duty ratio.

BRIEF DESCRIPTION OF THE DRAWINGS

FIG. 5 is a schematic (No. 2) explaining the second preferred embodiment according to the present invention.

DESCRIPTION OF THE PREFERRED EMBODIMENTS

The object is achieved by the following means in a preferred embodiment according to the present invention.

Firstly, phase modulation of a frequency $f_0$ is performed for light output from a single wavelength laser light source (frequency f). At this time, assume that $\omega$ ($\omega=2\pi f$) is the angular frequency of a single wavelength laser light source, p is a modulation angular frequency ($p=2\pi f_0$), m is the phase modulation index, and $J_v$ is Bessel function of the first kind of an order v. In this case, the real part of light generated as a result of the phase modulation is represented by an equation (2).

$$f(t) = A\cos(\omega t + m\cos(pt)) \quad (2)$$

$$= A\sum_{v=-\infty}^{\infty} J_v(m)\cos\left[(\omega+vp)t + v\frac{\pi}{2}\right]$$

This equation indicates that a new wavelength component (mode of the order v) is generated for each modulation angular frequency $\rho$ (namely, a frequency interval $f_0$). Hereinafter, this component is referred to as a modulation spectrum component. Here, specific numerical values of the used frequency f and the modulation frequency $f_0$ are described. The frequency f of the single wavelength laser light source is in a 200-tera hertz (THz, tera: $10^{12}$) band, since a wavelength in an optical fiber communication is in a 1.5 micrometer (μm, micro: $10^{-6}$) band. The modulation frequency $f_0$ corresponds to a bit rate when an optical pulse is used as a light source for transmission of an optical communication. Namely, the modulation frequency $f_0$ becomes 10 GHz or 40 GHz.

Figure 1:
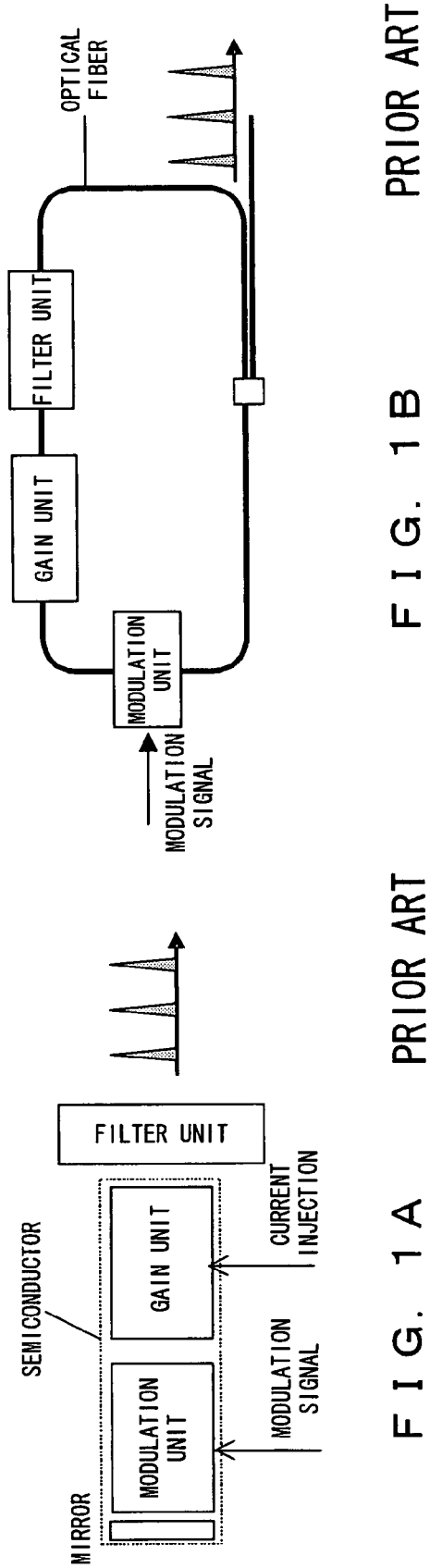
FIGS. 1A and 1B show the basic configurations of techniques using a mode-locked laser pulse light source.
Figure 2:
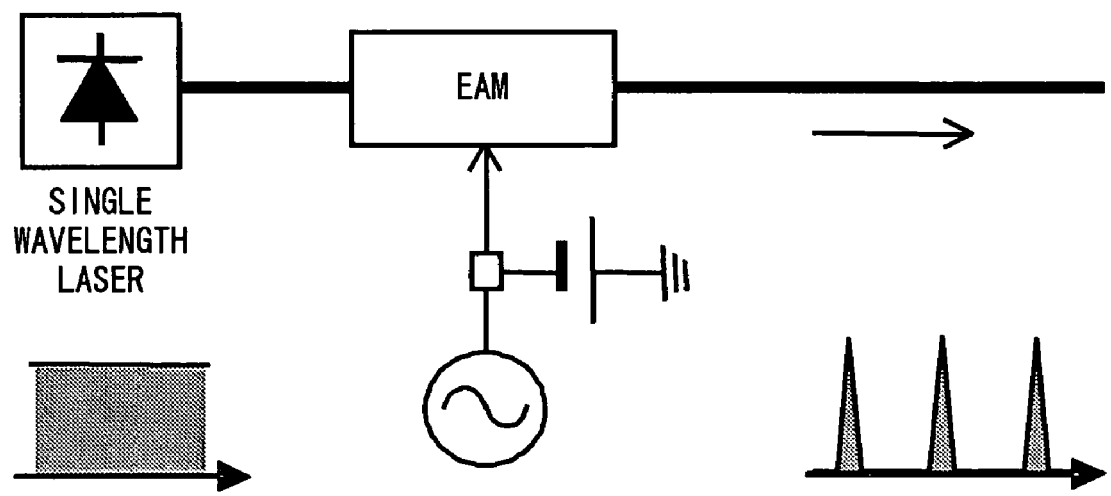
FIG. 2 shows the basic configuration of a technique using a direct modulation pulse light source.
Figure 3A:
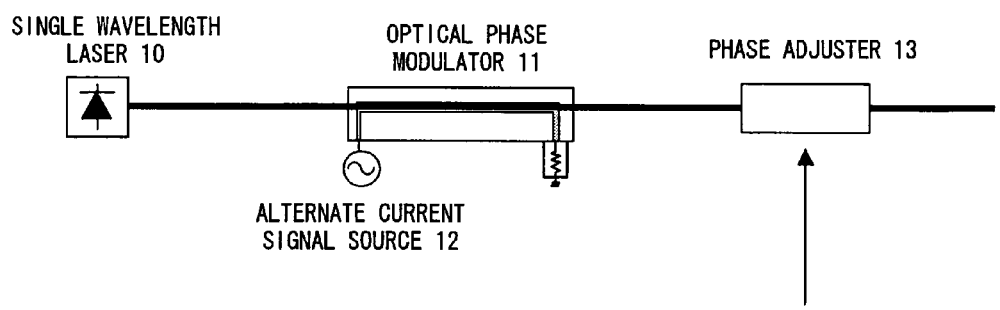
FIGS. 3A and 3B are schematics explaining a first preferred embodiment according to the present invention.
Figure 3B:
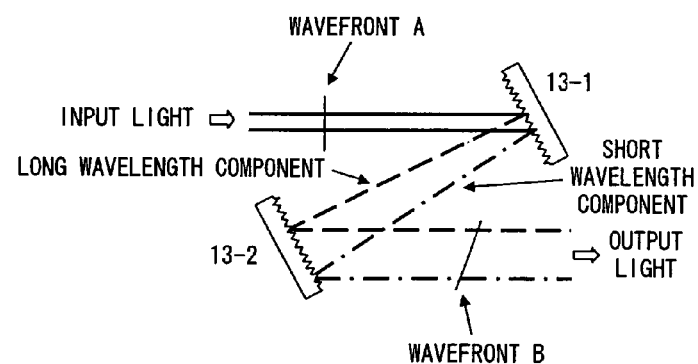

FIGS. 3A and 3B are schematics explaining the first preferred embodiment according to the present invention. FIG. 3A shows the entire configuration.

If phase modulation is performed by a phase modulator 11 for light output from a single wavelength laser light source 10, modulation spectrum components are generated. However, the phases of wavelength components of the modulation spectrum components of the light for which the phase modulation is performed are not aligned, and are in the state of continuous light as a time waveform. To generate an optical pulse, the phases of the wavelength components of the modulation spectrum components must be aligned by a phase adjuster 13.

As the device performing the phase modulation (the phase modulator 11), for example, an $LiNbO_3$ optical phase modulator (LN optical phase modulator) may be used. This optical modulator has already been commercialized. For the modulation signal, for example, a general-purpose alternate current signal oscillator (synthesizer) may be used. To adjust the phase relationship among the modulation spectrum components of the light for which the phase modulation is performed, a plane blazed grating may be used. The principle of the phase adjuster is shown in FIG. 3B. The phase adjuster is configured by two plane blazed gratings. A first plane blazed grating 13-1 splits a light beam at a diffraction angle according to a wavelength. Next, a second plane blazed grating 13-2 converts the split light beams into parallel light beams. The series of operations causes a difference among the paths of the wavelength components. As shown in this figure, a time difference of a wavefront b from a wavefront a occurs according to a wavelength, so that the wavefront is shifted. Namely, the phase adjustment according to the wavelength can be given.

As the single wavelength laser light source 10, a laser light source of a wavelength 1550 nm (frequency 193.4145 THz) is used. Laser light output from the single wavelength laser light source 10 is input to the optical phase modulator 11 to generate modulation spectrum components. Here, sine wave phase modulation of a modulation index $5\pi$ is performed. The phase modulation of the modulation index $5\pi$ can be implemented by driving a modulator, whose drive voltage $V_\pi=1$ V and which is reported in Optical Fiber Communication Conference, with a sine wave signal output from an alternate current signal source 12 having modulation signal power of 24 dBm. The power of the modulation signal is a value that can be sufficiently supported if an electric signal amplifier is used. At this time, if it is assumed that the frequency of the modulation signal is 10 GHz, approximately 30 modulation spectrum components occur. The phases of these modulation spectrum components are adjusted by the plane blazed gratings 13. As a result, an optical pulse having a pulse width of 3 ps or smaller is generated.

Figure 4:
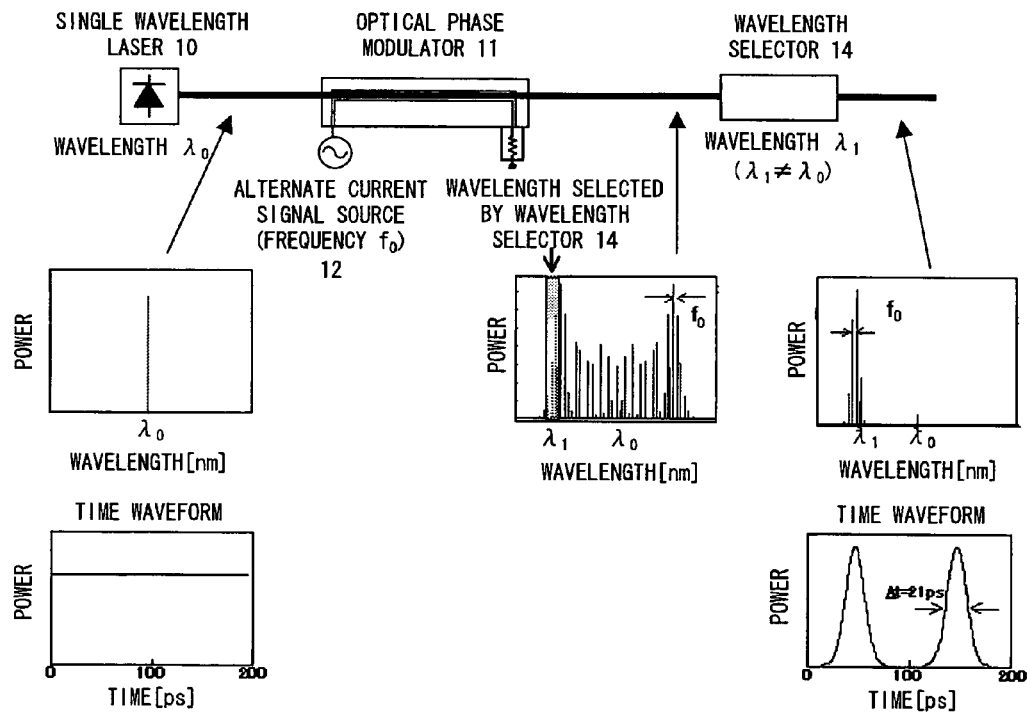
FIG. 4 is a schematic (No. 1) explaining a second preferred embodiment according to the present invention.

FIG. 4 shows the configuration of the second preferred embodiment according to the present invention.

In this preferred embodiment, the wavelength of a single wavelength laser is displaced to a frequency band, in which an optical pulse shift is small, with a wavelength selector 14, so that the output light becomes an optical pulse. Phase modulation of a modulation frequency $f_0$ and a modulation index $5\pi$ is performed for the light output from the single wavelength laser light source 10 of a wavelength $\lambda_0$. A wavelength $\lambda_1$ ($\lambda_1 \neq \lambda_0$) of a modulation spectrum component generated as a result of the phase modulation is selected by a wavelength selector 14. If a wavelength of a full-width at half-maximum band 21 GHz is selected in the case of $f_0$=10 GHz, an optical pulse having a pulse width of 21 ps can be generated. The time-bandwidth product of this optical pulse is 0.44. With this method, an optical pulse of Fourier Transform Limited (TL) can be generated. This preferred embodiment uses a phenomenon that a phase shift among the respective wavelength components of modulation spectrum components is relatively small in a frequency band where a change in frequency chirp is small as shown in FIG. 5.

What is claimed is:

1. An optical pulse generating apparatus, comprising:

a light source outputting single wavelength light; and an optical pulse generating unit generating an optical pulse by generating modulation spectrum components by performing phase modulation for light from said light source, and by adjusting phases of wavelengths of the modulation spectrum components included in generated light.

2. An optical pulse generating apparatus, comprising:

a light source outputting single wavelength light; and an optical pulse generating unit generating an optical pulse by performing phase modulation for light output from said light source, and by selecting, with a wavelength selector, wavelength components phases of which are aligned among the modulation spectrum components included in the generated light, and which are different from said light source.

* * * * *